United States Patent
Karuppiah et al.

(10) Patent No.: US 12,309,034 B2
(45) Date of Patent: May 20, 2025

(54) SYSTEMS AND METHODS TO DETECTING THE SOURCE OF A TOPOLOGY CHANGE NOTICE (TCN)

(71) Applicant: DELL PRODUCTS L.P., Round Rock, TX (US)

(72) Inventors: Kannan Karuppiah, Fremont, CA (US); Senthil Kumar Ganesan, San Ramon, CA (US); Udhaya Chandran Shanmugam, Santa Clara, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 470 days.

(21) Appl. No.: 17/868,717

(22) Filed: Jul. 19, 2022

(65) Prior Publication Data

US 2024/0031237 A1    Jan. 25, 2024

(51) Int. Cl.
```
H04W 40/22      (2009.01)
G06F 11/14      (2006.01)
G06F 15/16      (2006.01)
G06F 15/173     (2006.01)
H04L 9/00       (2022.01)
H04L 12/44      (2006.01)
H04L 41/0816    (2022.01)
H04L 41/12      (2022.01)
```
(52) U.S. Cl.
CPC .............. *H04L 41/12* (2013.01); *H04L 12/44* (2013.01); *H04L 41/0816* (2013.01)

(58) Field of Classification Search
CPC ......... H04L 45/66; H04L 41/12; H04L 12/44; H04L 41/0816; H04L 12/4641; H04L 45/02; H04L 9/3226; H04L 9/3263; H04L 9/3297; H04L 45/18; H04L 2209/56; H04L 2209/603; H04L 2209/80; H04L 45/48; H04L 45/00; H04L 45/28; H04L 45/583; H04L 49/602; H04W 40/22; H04W 40/248; H04W 84/22; H04W 88/04; G06F 11/1464; G06F 11/1469
USPC ........................................................ 370/256
See application file for complete search history.

(56) References Cited

U.S. PATENT DOCUMENTS

| | | | |
|---|---|---|---|
| 6,976,088 B1 * | 12/2005 | Gai ..................... | H04L 12/4641 370/256 |
| 8,503,358 B2 * | 8/2013 | Hanson ................. | H04W 60/00 370/328 |
| 2002/0046271 A1 * | 4/2002 | Huang .................. | H04L 45/583 370/256 |
| 2006/0133286 A1 * | 6/2006 | Elie-Dit-Cosaque ... | H04L 45/00 370/389 |

(Continued)

*Primary Examiner* — Edan Orgad
*Assistant Examiner* — Vanneilian Lalchinthang
(74) *Attorney, Agent, or Firm* — BAUGH LAW, LLC (57) ABSTRACT

When an event occurs in the network that affects an information handling system in the network, a topology change notice (TCN) may be propagated so that the network topology can be regenerated. However, currently, there is no mechanism to readily identify the source information handling system of the TCN. To address issues, in one or more embodiments, when an information handling system (such as a network switch) initiates a TCN, it sends a specialized message to keep track of the source of the TCN. In one or more embodiments, information handling systems that receive the specialized message may record information about the source and forward it to other information handling systems in the network.

20 Claims, 8 Drawing Sheets

(56) References Cited

U.S. PATENT DOCUMENTS

| | | | |
|---|---|---|---|
| 2008/0031154 A1* | 2/2008 | Niazi | H04L 12/4625 |
| | | | 370/254 |
| 2009/0028050 A1* | 1/2009 | Winter | H04L 43/0894 |
| | | | 370/236 |
| 2009/0083372 A1* | 3/2009 | Teppler | H04L 9/3297 |
| | | | 380/277 |
| 2013/0024726 A1* | 1/2013 | Andrews | G06F 11/1464 |
| | | | 714/15 |
| 2013/0250815 A1* | 9/2013 | Singh | H04L 45/484 |
| | | | 370/256 |
| 2013/0301553 A1* | 11/2013 | Klein | H04W 76/12 |
| | | | 370/329 |
| 2014/0071885 A1* | 3/2014 | Cherian | H04W 40/22 |
| | | | 370/315 |
| 2014/0219081 A1* | 8/2014 | Natarajan | H04L 41/0659 |
| | | | 370/228 |
| 2016/0212041 A1* | 7/2016 | Krishnamurthy | H04L 45/66 |

\* cited by examiner

| Protocol Identifier | Version | Message Type | Flags | Root ID | Root Path Cost | Bridge ID | Port ID | Message Age | Maximum Time | Hello Time | Forward Delay | Source of TCN MAC | UUID |

300

305 — (Protocol Identifier ... Flags)
310 — (Source of TCN MAC)
315 — (UUID)

SYSTEMS AND METHODS TO DETECTING THE SOURCE OF A TOPOLOGY CHANGE NOTICE (TCN)

BACKGROUND

A. Technical Field

The present disclosure relates generally to information handling systems. More particularly, the present disclosure relates to topology change notices.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Network topologies are a connection of information handling system, in which the information handling systems form nodes, and these nodes are interconnected through a set of links. There are a number of types of topologies, including (but not limited to): bus, spine-leaf, ring, star, tree, mesh, and hybrid. Due to the interconnections, a network may employ a network protocol that builds a loop-free logical topology for the network. This protocol is called Spanning Tree Protocol (STP). Because some information handling systems are connected with redundant links, due to the STP, some of the links are active and some of the links are placed into an inactive state to avoid network loops.

When an event occurs in the network that affects an information handling system in the network, a topology change notice (TCN) is propagated so that the network topology can be regenerated. Consider, by way of illustration, the network 100 depicted in FIG. 1. Assume that the port connected to link 140 at information handling system 110 goes down. This down link 140 affects the topology of the network 100. Thus, information handling system 125, along with 110, may send a TCN, using a Bridge Protocol Data Unit (BPDU) message, to alert the other information handling systems in the network. One problem with this methodology is that there is no way of knowing at any of the other information handling systems which information handling system in the network was the original source of the TCN. This inability to ascertain which information handling system was the originator makes tracking the source of the event more difficult.

Accordingly, it is highly desirable to find ways to identify the source device of a topology change notification.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

A. General Introduction

As noted above, in the spanning tree protocol, a topology change notice (TCN) is generated when a link event occurs. This TCN is propagated to the entire network and triggers a new spanning tree convergence. While one can identify the source port that receives a TCN in each bridge, one cannot identify the source device that generated the initial TCN.

Figure 1:
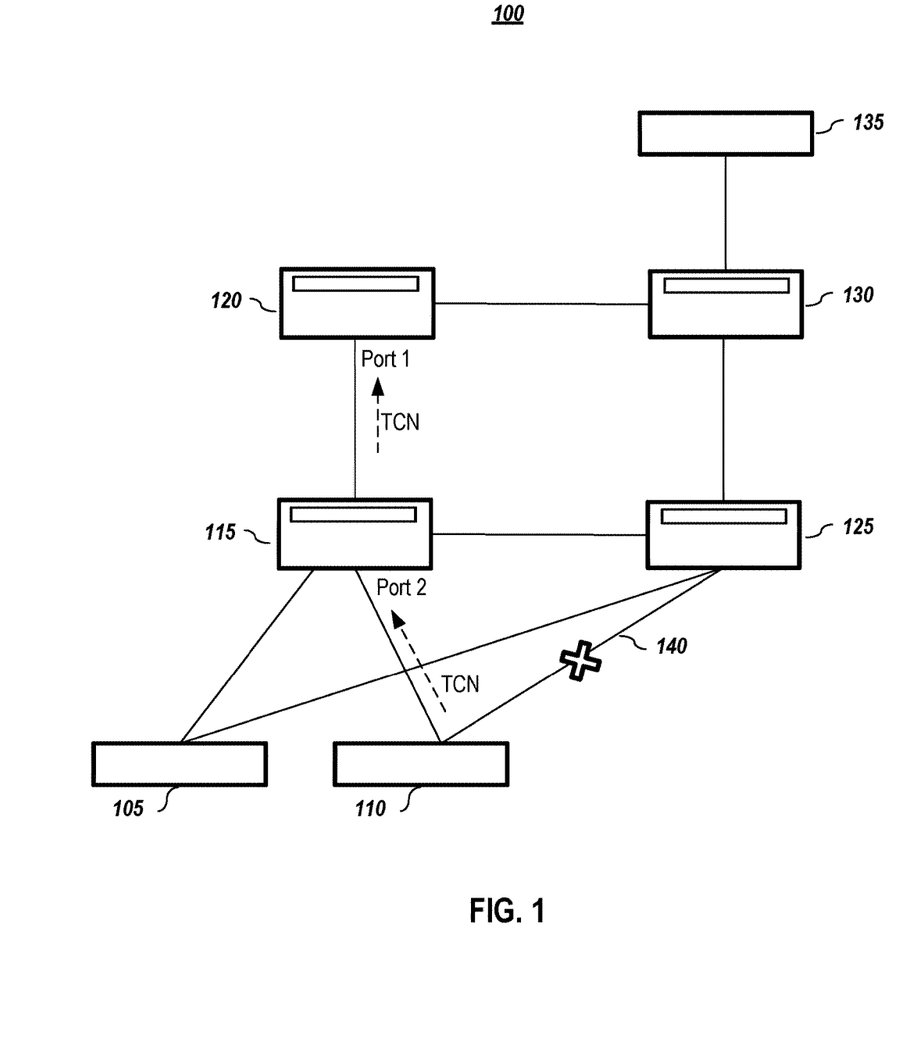
FIG. 1 ("FIG. 1") depicts an example network for illustration purposes.

Consider, by way of illustration, the following example. Assume information handling system 110, which may be a network switch, generates a TCN due to down link 140. If one checks the information handling system 120, it will indicate that the TCN was received via port 1. To identify the source of TCN, a user must work backwards by going to information handling system 115 and checking whether it originated the message or check the source port of TCN. In this case, the information handling system 115 received the message on port 2. Thus, the process continues until the source of TCN is found.

To add to the complexity of trying to identify a source of a TCN, for many networking or datacenter sites, the sustaining and support teams do not have access to all of the networking elements (such as wireless access points, switches, routers, etc.). Thus, the support/sustaining team may not be able to pinpoint the source of TCN. They may be able to shut down some ports to resolve network issues, but the customer may need to examine the network to resolve the source of the TCN.

Accordingly, to address these issues, in one or more embodiments, when an information handling system (such as a network switch) initiates a TCN, it will send new or specialized message to keep track of the source of the TCN. In one or more embodiments, this specialized message may be referred to as a "debug BPDU." Information handling systems that receive the specialized message may record information about the source and will forward it to another information handling system in the network. As will be explained below, in one or more embodiments, a non-standard destination media access control (DMAC) may be used to address handling of the specialized message by an information handling system that is not configured to identify and use the specialized message.

B. Method Embodiments

Figure 2:
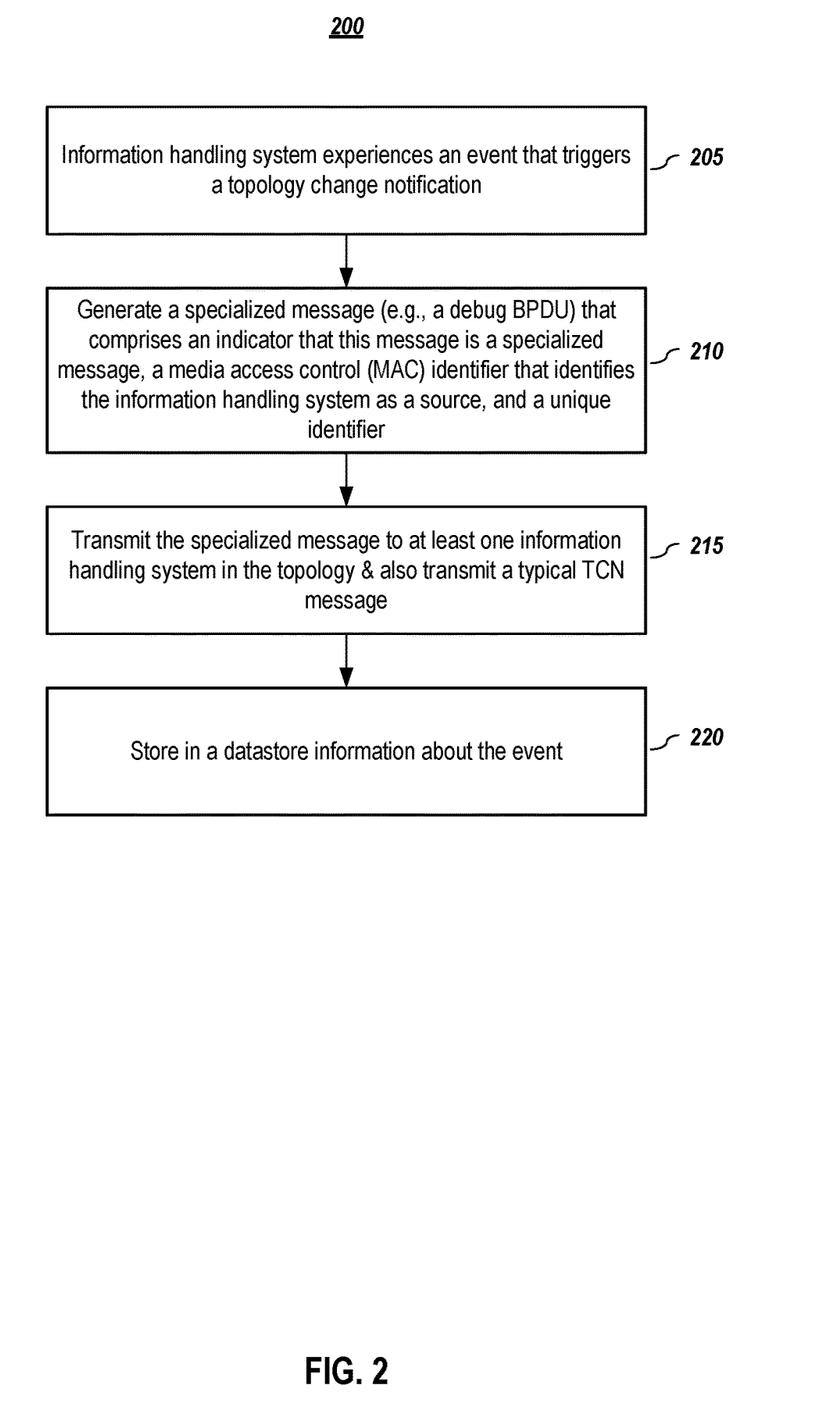
FIG. 2 depicts a methodology for noting or recording a source of a topology change notification, according to embodiments of the present disclosure.

FIG. 2 depicts a methodology for noting or recording a source of a topology change notification, according to embodiments of the present disclosure. Responsive to an information handling system in a network experiencing (205) an event that triggers a topology change notification (TCN), the information handling system generates (210) a specialized message. In one or more embodiments, the specialized message comprises an indicator that this message is a specialized message, a media access control (MAC) identifier in a MAC (MAC) field that identifies the information handling system as a source of the specialized message; and a unique identifier in a unique identifier field that comprises at least a timestamp of when the specialized message was generated. In one or more embodiments, the specialized message may be a new type of Spanning Tree Protocol (STP) Bridge Protocol Data Unit (BPDU) message that uses a BPDU format, and the indicator is in message type field, which identifies the message as being this new type of BPDU message. Embodiments of this specialized message, which may be a new type of BPDU message, may be referred to herein for convenience as a debug BPDU.

Figure 3:
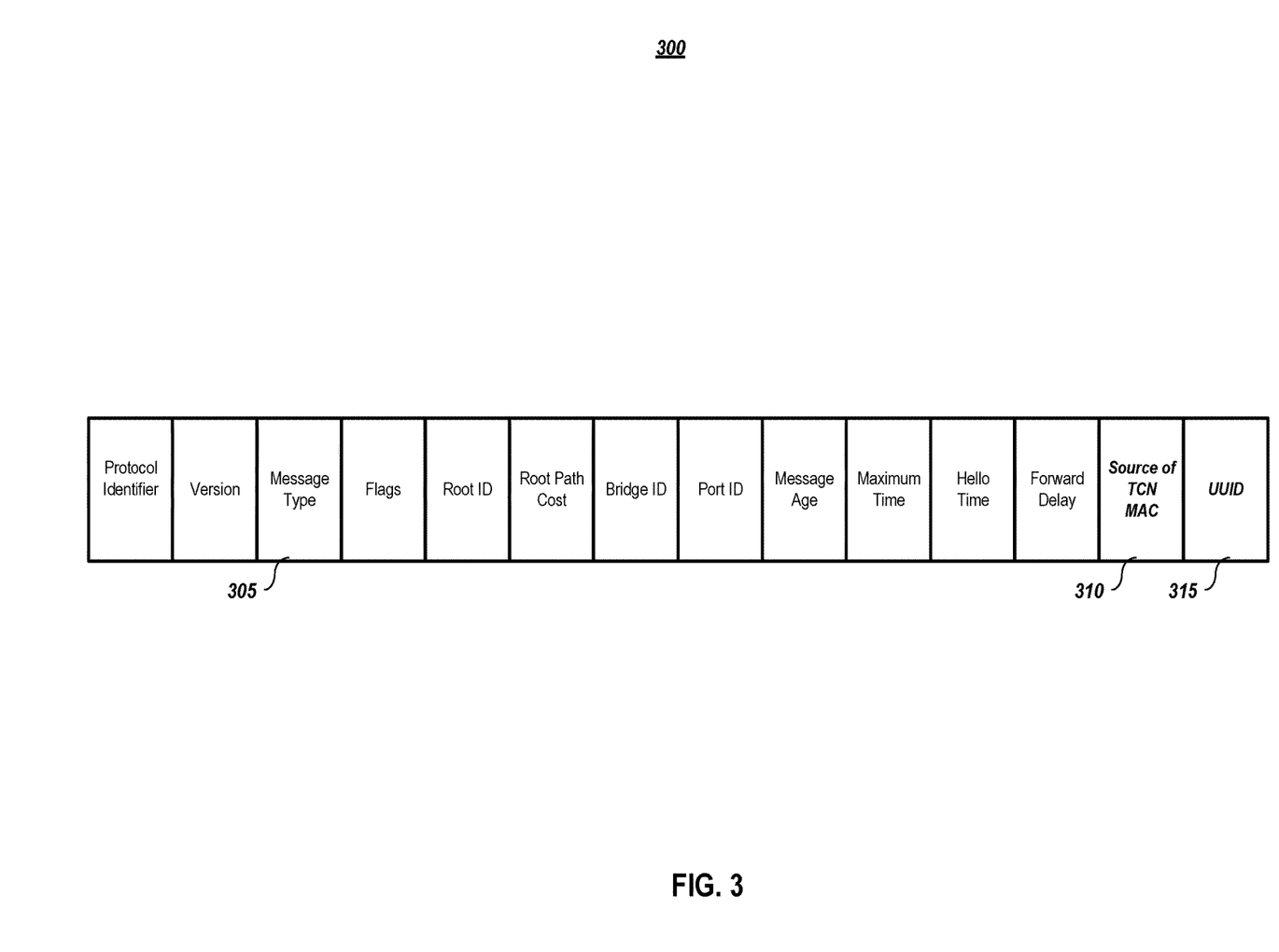
FIG. 3 depicts a format for a Bridge Protocol Data Unit (BPDU) message that may be used for a specialized message, according to embodiments of the present disclosure.

FIG. 3 depicts a format for a Bridge Protocol Data Unit (BPDU) message that may be used for the specialized message, according to embodiments of the present disclosure. The depicted embodiment 300 illustrates fields of the debug BPDU message, although it shall be noted that more or fewer fields may be used and that they may be arranged differently. In one or more embodiments, to identify that this message is a specialized message (e.g., a debug BPDU message), an indicator that identifies the messages as being a debug BPDU message is included in the "Message Type" field 305. For example, a specific value in the "Message Type" field 305 identifies the message as being a specialized message that is being used to track a source of a TCN.

Also as illustrated in FIG. 3, the specialized message may include a field, "Source of TCN MAC" 310, in which the source media access control (MAC) address of the information handling system that originated the topology change notice. As noted above, the specialized message may also include a unique identifier, which may be stored in a universally unique identifier UUID field 315. In one or more embodiments, the unique identifier is generated using a system MAC and service TAG and/or time stamp. Also, in one or more embodiments, the unique identifier may also include a timestamp of when the specialized message was generated, when a corresponding TCN BPDU message was generated for the event, or both. In one or more embodiments, by including the timestamp of the corresponding TCN BPDU message with the specialize message, the timestamp information may be used for correlating the specialized message with the corresponding TCN BPDU message; alternatively, a different unique identifier may be used to correlate both messages as being related to the same triggering event.

Returning to FIG. 2, having generated the specialized message, the information handling system transmits (215) the specialized message to at least one information handling system in the network. Also, in one or more embodiments, the information handling system stores (220) information about the event in a datastore. Logging information about the event be used by the system or by a system administrator for performing any of a number of functions, including (but not limited to): diagnostics, planning, root cause analysis, and for other reasons.

It shall be noted that, in one or more embodiments, the information handling system will also generate and transmit a typical TCN (e.g., an STP BPDU message) related to the triggering event. One of the benefits of sending a typical topology change notice is that it is not uncommon for networks to comprise a heterogeneous mixture of information handling systems. Therefore, because it is possible that not every information handling system in the network supports handling of this new specialized message, sending a typical topology change notice ensures that the appropriate execution of the spanning tree protocol is performed to reflect the changed network. Thus, by sending a typical topology change notice message in addition to the specialized message, embodiments ensure backwards compatibility.

Figure 4:
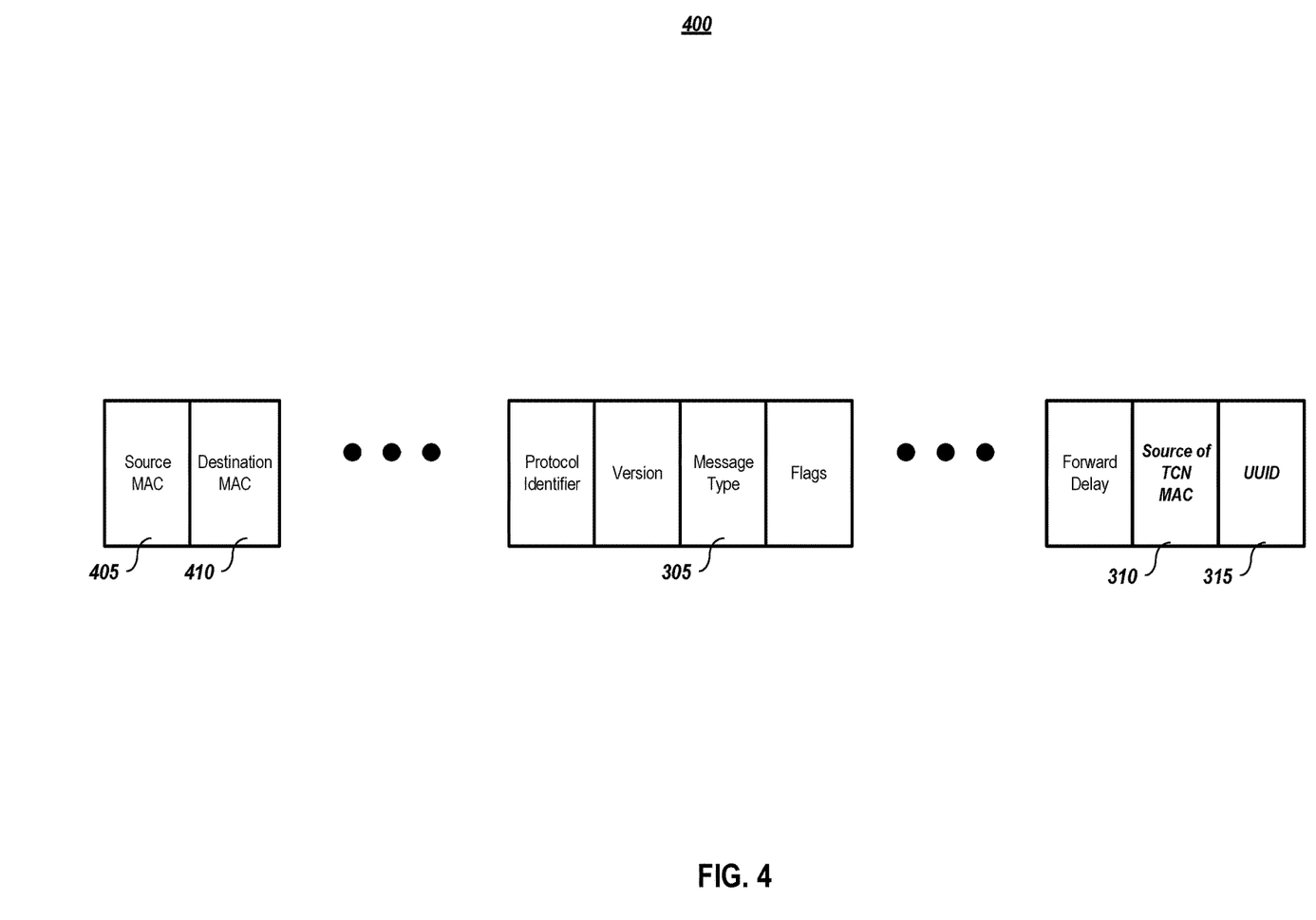
FIG. 4 depicts another version of a format for a Bridge Protocol Data Unit (BPDU) message that may be used for a specialized topology change notification (TCN) message, according to embodiments of the present disclosure.

In one or more embodiments, a header of the specialized message may include in the destination media access control (DMAC) address that is a non-standard DMAC address in a DMAC field to facilitate interoperability with any information handling system in the network that do not recognize the specialized message. Consider, by way of illustration and not limitation, the format depicted in FIG. 4, which includes a source MAC address 405 and destination MAC address 410 as part of the header to the specialized message. Typically, if an intermediate node receives the specialized message and treats it as a typical STP BPDU message, it will send the message to its central processing unit (CPU) and will not forward along the message to additional information handling systems in the network. However, if the intermediate node does not recognize the destination MAC address, it will, as a matter of typical processing, flood the message to other information handling systems in the network. Typically, a MAC address is used that identifies the packet as a STP packet; however, by using a non-standard identifier (e.g., a vendor Organizationally Unique Identifier (OUI) or some other unique identifier), the receiving information handling system will not process the message as a typical STP message. Thus, by using a non-standard DMAC address, embodiments herein ensure that the specialized message gets propagated even when the network contains information handling systems that do not support processing of that specialized message.

Figure 5:
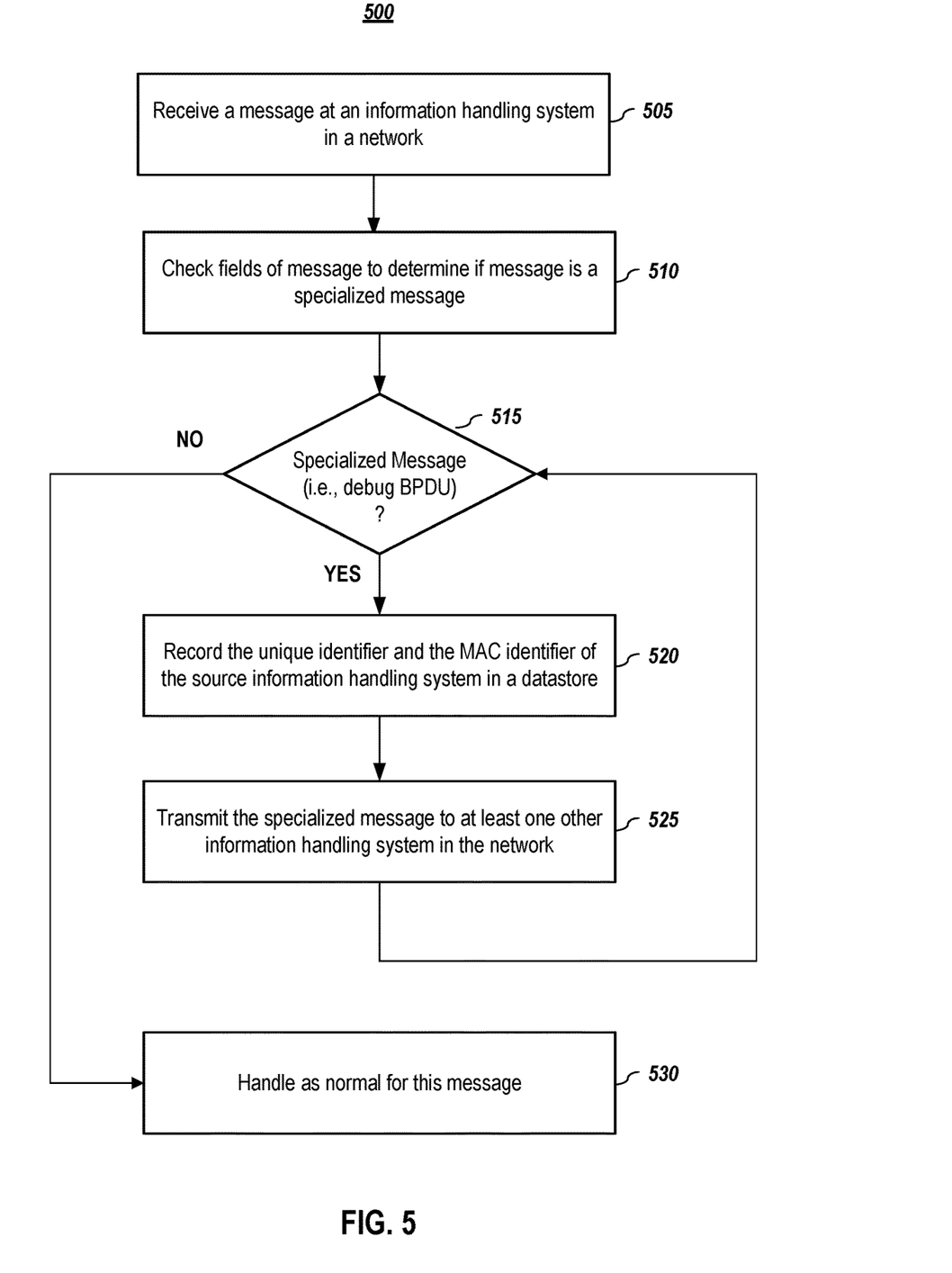
FIG. 5 depicts a methodology for an information handling system that receives a specialized TCN message, according to embodiments of the present disclosure.

Turning now to FIG. 5, depicted is a methodology for an information handling system that receives a specialized message, according to embodiments of the present disclosure. For convenience, such an information handling system may also be referred to herein as an intermediate node. In one or more embodiments, an information handling system in a network receives (505) a message, and the information handling system checks (510) whether the message is a specialized message. In one or more embodiments, the information handling system may check (510) the indicator (if any) in a message type field. If there is an indicator present and if the indicator identifies the message as being a specialized message, it may be treated as such. Alternatively, the information handling system may also require that the destination media access control (DMAC) address in the STP control plane MAC/header be a non-standard DMAC address in order to deem the message as being a proper specialized message (e.g., a debug BPDU). As noted above, using this non-standard DMAC address facilitate interoperability with any information handling system in the network that do not recognize the specialized message.

In one or more embodiments, the intermediate node sends (525) the specialized message via all its forwarding ports. If a port is in a "blocked" state, packets for the specialized message are not sent to that port to break the loop. Note that, if an intermediate node does not understand the specialized message, it will not affect the STP convergence.

As noted in FIG. 5, responsive to the message being a specialized message, the intermediate node stores (520) information about the specialized message (e.g., the unique identifier and the MAC identifier of the source information handling system) in a datastore. In one or more embodiments, each node in the network may store the received specialized message information. In one or more embodiments, a maximum number of specialized messages may be stored at a node based on one or more parameters (e.g., certain time period, a set number of specialized messages received, etc.). For example, an information handling system may store information about the debug BPDU messages received for the last one hour or may store information about the last 1000 debug BPDU messages. As noted below, this information may be used for a number of reasons.

Figure 6:
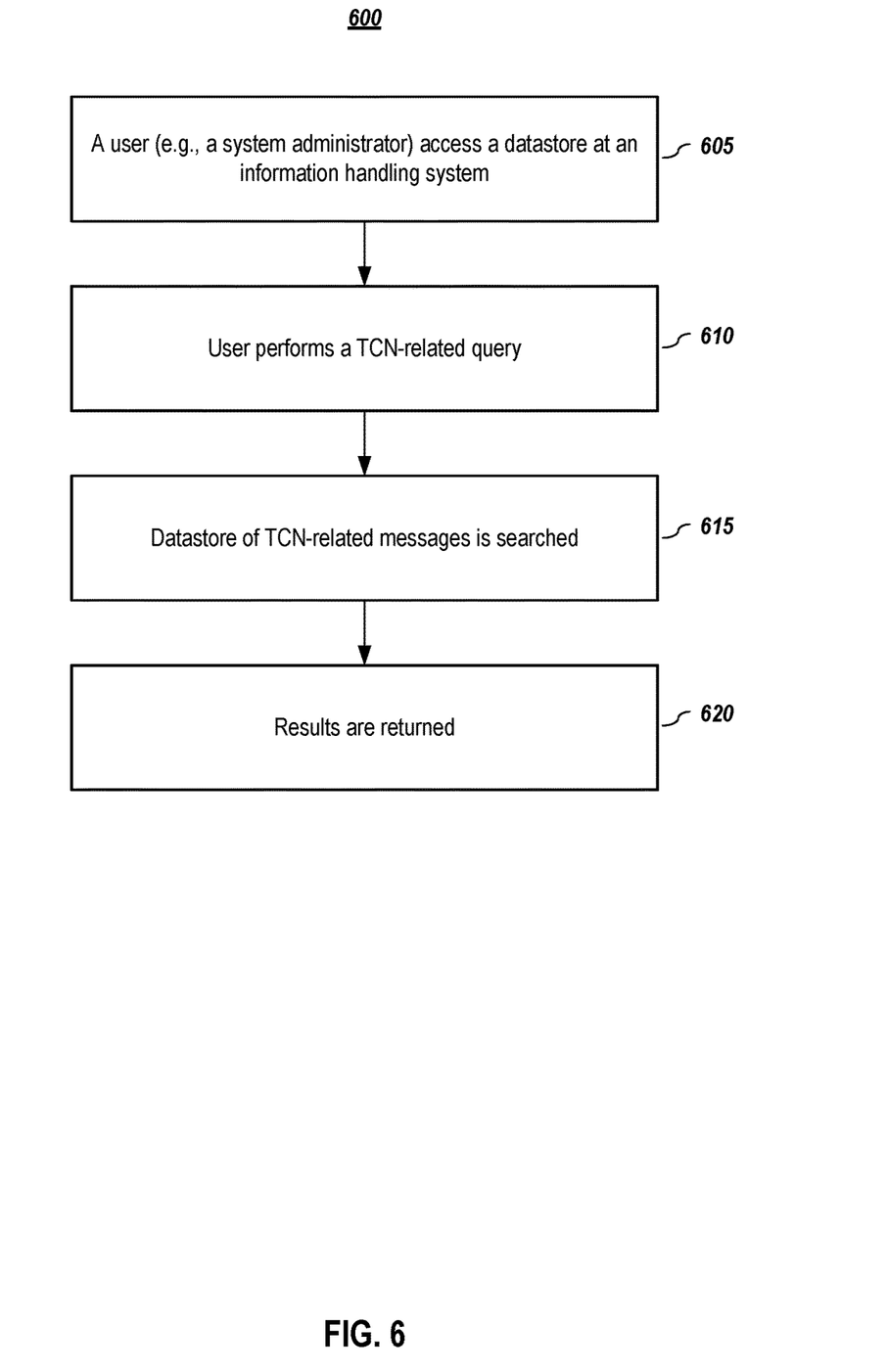
FIG. 6 depict a methodology for utilizing information collected from specialized TCN messages, according to embodiments of the present disclosure.

FIG. 6 depict a methodology for utilizing information collected as a result of one or more of the embodiments herein, according to embodiments of the present disclosure. In one or more embodiments, a user (e.g., a system administrator) may poll, log into, or otherwise access (605) this stored information to identify information related to TCNs.

In one or more embodiments, a user may perform (610) queries of this information, in which information in one or more of the datastores may be searched (615) and the relevant results are returned (620).

As noted above, this information may be used for a number of purposes, including but not limited to diagnostics, planning, root cause analysis, and for other reasons. For example, if a vendor supports handling of the specialized message, the user may determine whether its devices are initiating the TCN in cases of a multi-vendor deployment.

Also, this information may be used to help identify if multiple sources are sending the TCN. In yet another example, one or more machine learning methods may use this information for analyses. For example, patterns may be found using this data (e.g., frequency of TCNs, TCNs occur for certain devices, at certain times, for devices with certain configurations or peripherals, etc.). It shall be noted, however, that a key to the analysis is that the source of the TCN can be found in any bridge in bridging domain quickly and easily. One skilled in the art shall recognize other uses for such data, which falls within the scope of the current disclosure.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 7:
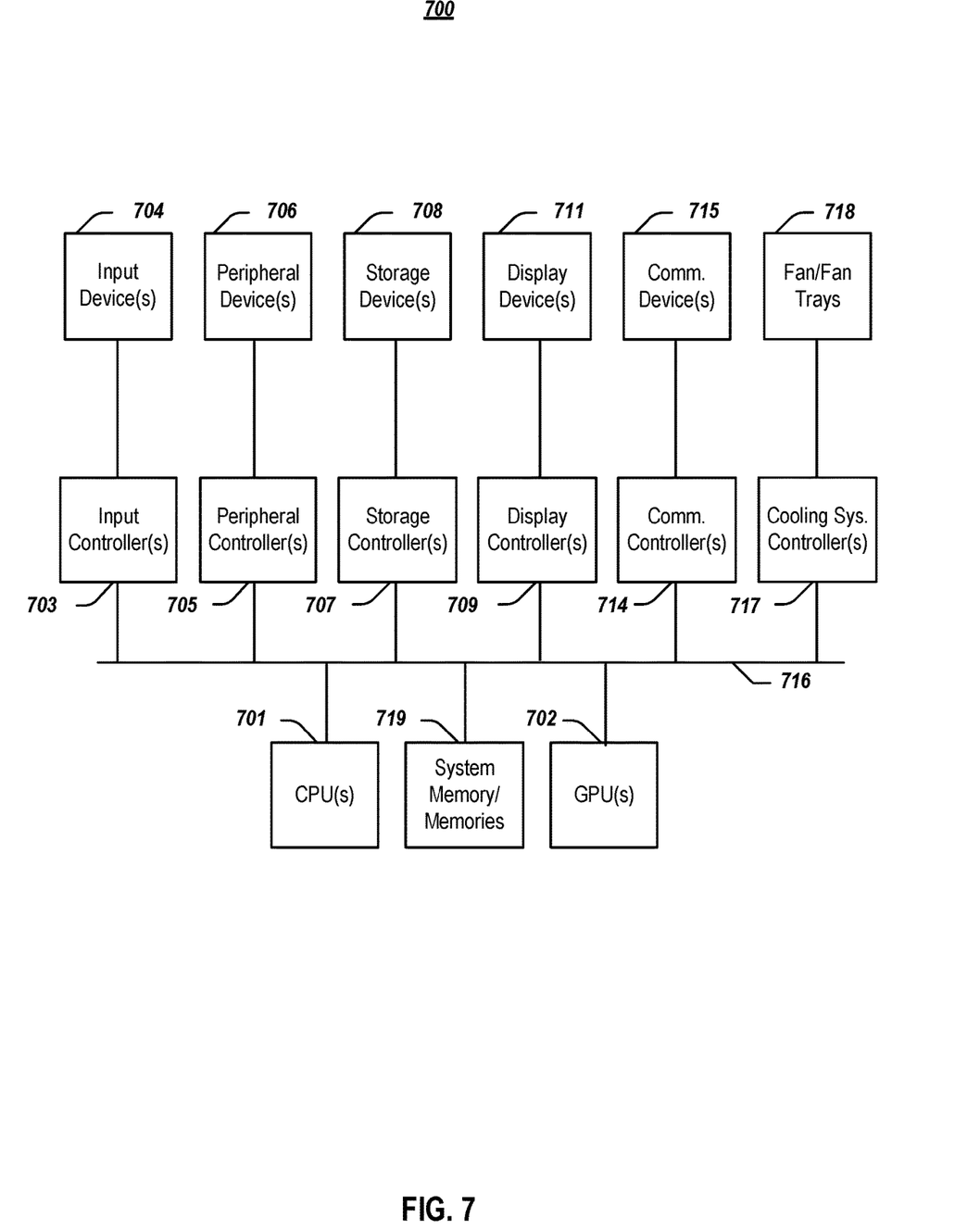
FIG. 7 depicts a simplified block diagram of an information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more CPUs 701 that provides computing resources and controls the computer. CPU 701 may be implemented with a microprocessor or the like and may also include one or more graphics processing units (GPU) 702 and/or a floating-point coprocessor for mathematical computations. In one or more embodiments, one or more GPUs 702 may be incorporated within the display controller 709, such as part of a graphics card or cards. The system 700 may also include a system memory 719, which may comprise RAM, ROM, or both.

A number of controllers and peripheral devices may also be provided, as shown in FIG. 7. An input controller 703 represents an interface to various input device(s) 704, such as a keyboard, mouse, touchscreen, stylus, microphone, camera, trackpad, display, etc. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 8:
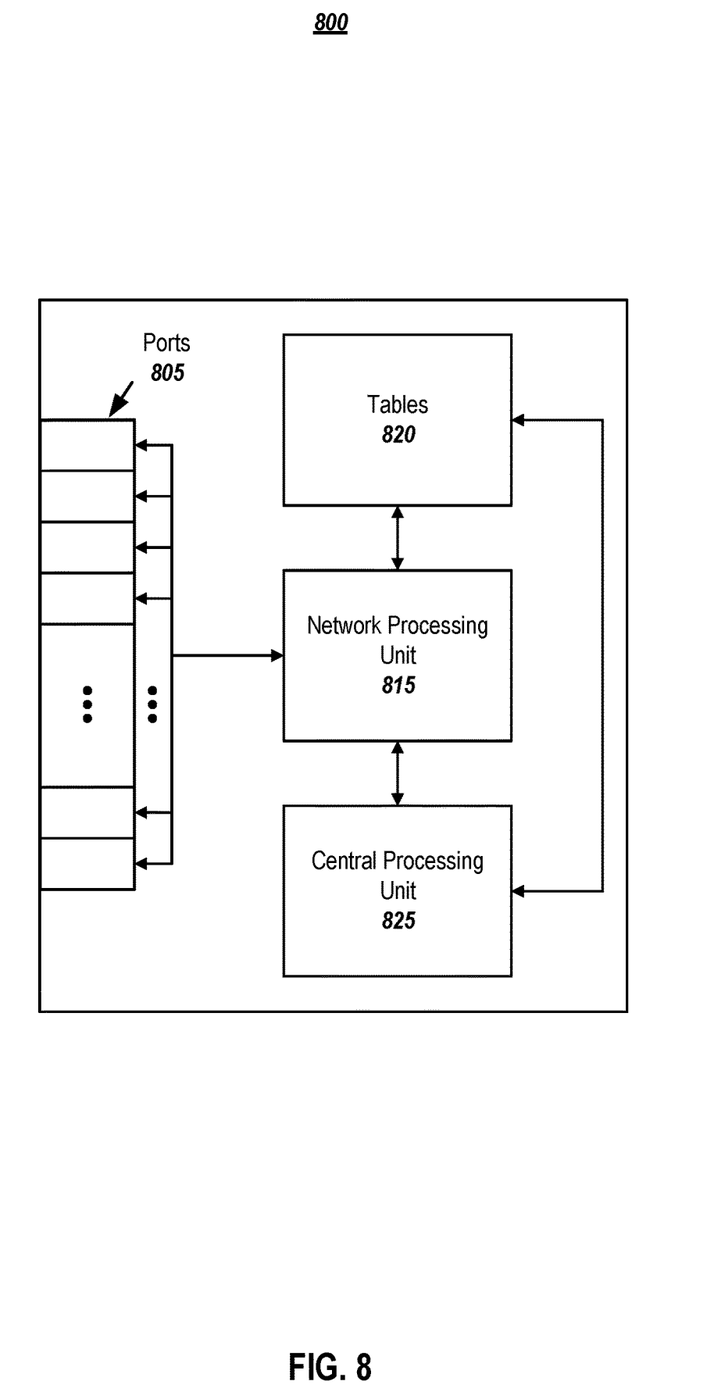
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure—although it shall be understood that such system may be differently configured and include different components, additional components, or fewer components.

The information handling system 800 may include a plurality of I/O ports 805, a network processing unit (NPU) 815, one or more tables 820, and a CPU 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. A computer-implemented method for noting a source of a topology change notification, the method comprising:
   responsive to an information handling system in a network experiencing an event that triggers a topology change notification (TCN):
      generating a specialized message that comprises:
         an indicator that this message is a specialized message;
         a media access control (MAC) identifier in a MAC field that identifies the information handling system as a source of the specialized message; and
         a unique identifier in a unique identifier field that comprises at least a timestamp of when the specialized message was generated; and
      transmitting the specialized message to at least one information handling system in the network.

2. The computer-implemented method of claim 1 further comprising:
   sending a standard TCN message to at least one information handling system in the network.

3. The computer-implemented method of claim 1 wherein the message is a new type of Spanning Tree Protocol (STP) Bridge Protocol Data Unit (BPDU) message that uses a BPDU format, and the indicator is in a message type field, which identifies the message as being this new type of BPDU message.

4. The computer-implemented method of claim 1 wherein the message further comprises:
   a non-standard destination media access control (DMAC) address in a DMAC field to facilitate interoperability with an information handling system in the network that does not recognize the specialized message.

5. The computer-implemented method of claim 1 wherein the unique identifier also comprises a universally unique identifier (UUID).

6. The computer-implemented method of claim 1 further comprising:
   logging information in a datastore related to the event that triggered the TCN.

7. The computer-implemented method of claim 6 further comprising:
   responsive to receiving a TCN-related query:
      querying the datastore using information from the TCN-related query; and
      returning results of the query.

8. A computer-implemented method for handling a message related to a topology change notification, the method comprising:
   receiving a message at an information handling system in a network, the message comprising:
      an indicator in a message type field that this message is a specialized message;
      a media access control (MAC) identifier in a MAC field that identifies a source information handling system as being the information handling system in the network that experienced an event that triggered a topology change notification (TCN); and a unique identifier in a unique identifier field that comprises at least a timestamp of when the specialized message was generated;
checking the message type field; and
responsive to the message type field indicating that the message is a specialized message, recording the unique identifier and the MAC identifier of the source information handling system in a datastore.

9. The computer-implemented method of claim 8 further comprising:
transmitting the specialized message to at least one other information handling system in the network, wherein a destination MAC address is not changed.

10. The computer-implemented method of claim 8 further comprising:
receiving a standard TCN message related to the event.

11. The computer-implemented method of claim 8 wherein the message further comprises:
a non-standard destination media access control (DMAC) address in a DMAC field to facilitate interoperability with an information handling system in the network that does not recognize the specialized message.

12. The computer-implemented method of claim 11 wherein the steps of checking the message type field and responsive to the message type field indicating that the message is a specialized message, recording the unique identifier and the MAC identifier of the source information handling system in a datastore further comprise:
checking the message type field and the DMAC field; and
responsive to the message type field indicating that the message is a specialized message and that the DMAC address in the DMAC field is a non-standard DMAC address, recording the unique identifier and the MAC identifier of the source information handling system in the datastore.

13. The computer-implemented method of claim 8 further comprising:
responsive to receiving a TCN-related query:
querying the datastore using information from the TCN-related query; and
returning results of the query.

14. An information handling system comprising:
one or more processors; and
a non-transitory computer-readable medium or media comprising one or more sets of instructions which, when executed by at least one of the one or more processors, causes steps to be performed comprising:
responsive to an information handling system in a network experiencing an event that triggers a topology change notification (TCN):
generating a specialized message that comprises:
an indicator that this message is a specialized message;
a media access control (MAC) identifier in a MAC field that identifies the information handling system as a source of the specialized message; and
a unique identifier in a unique identifier field that comprises at least a timestamp of when the specialized message was generated; and
transmitting the specialized message to at least one information handling system in the network.

15. The information handling system of claim 14 wherein the non-transitory computer-readable medium or media further comprises one or more sequences of instructions which, when executed by at least one of the one or more processors, causes steps to be performed comprising:
sending a standard TCN message to at least one information handling system in the network.

16. The information handling system of claim 14 wherein the message is a new type of Spanning Tree Protocol (STP) Bridge Protocol Data Unit (BPDU) message that uses a BPDU format, and the indicator is in a message type field, which identifies the message as being this new type of BPDU message.

17. The information handling system of claim 14 wherein the message further comprises:
a non-standard destination media access control (DMAC) address in a DMAC field to facilitate interoperability with an information handling system in the network that does not recognize the specialized message.

18. The information handling system of claim 14 wherein the unique identifier also comprises a universally unique identifier (UUID).

19. The information handling system of claim 14 wherein the non-transitory computer-readable medium or media further comprises one or more sequences of instructions which, when executed by at least one of the one or more processors, causes steps to be performed comprising:
logging information in a datastore related to the event that triggered the TCN.

20. The information handling system of claim 19 wherein the non-transitory computer-readable medium or media further comprises one or more sequences of instructions which, when executed by at least one of the one or more processors, causes steps to be performed comprising:
responsive to receiving a TCN-related query:
querying the datastore using information from the TCN-related query; and
returning results of the query.

* * * * *